United States Patent
Lungershausen et al.

(10) Patent No.: US 9,783,120 B2
(45) Date of Patent: Oct. 10, 2017

(54) LOAD CARRIER FOR A MOTOR VEHICLE

(71) Applicant: GM GLOBAL TECHNOLOGY OPERATIONS LLC, Detroit, MI (US)

(72) Inventors: Dirk Rainer Lungershausen, Wiesbaden (DE); Gunther Heim, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 14/804,763

(22) Filed: Jul. 21, 2015

(65) Prior Publication Data
US 2015/0321620 A1 Nov. 12, 2015

Related U.S. Application Data

(62) Division of application No. 12/595,579, filed on Oct. 12, 2009, now Pat. No. 9,120,429.

(51) Int. Cl.
*B60R 9/06* (2006.01)
*B60R 9/10* (2006.01)

(52) U.S. Cl.
CPC . *B60R 9/10* (2013.01); *B60R 9/06* (2013.01)

(58) Field of Classification Search
CPC ............... B60R 9/06; B60R 9/08; B60R 9/10
USPC ......... 280/769; 224/488, 489, 495, 502, 509
See application file for complete search history.

(56) References Cited

U.S. PATENT DOCUMENTS

| 3,158,302 A | * | 11/1964 | Dickerson | ................ B60R 9/06 224/495 |
| 3,176,903 A | * | 4/1965 | Farley | ...................... B60R 9/06 224/490 |
| 3,528,578 A | * | 9/1970 | Schoenberger | ........... B60R 9/06 224/492 |

(Continued)

FOREIGN PATENT DOCUMENTS

| BE | 1012537 A6 | 12/2000 |
| DE | 10144550 A1 | 4/2003 |

(Continued)

OTHER PUBLICATIONS

International Searching Authority, International Search Report for Application No. PCT/EP2008/051614, dated Jul. 17, 2008.

(Continued)

*Primary Examiner* — Jeffrey J Restifo
(74) *Attorney, Agent, or Firm* — Lorenz & Kopf LLP

(57) ABSTRACT

A vehicle includes a rearward structure and a load carrier having a stowed position and a transport position. The load carrier includes a longitudinal carrier, an extendable rail connected within the longitudinal carrier, a base segment assembled on the extendable rail for mounting at least one bicycle, and a swiveling axis mounted between the longitudinal carrier and the extendable rail to pivot the extendable rail and the base segment away from the rearward structure of the vehicle to be able to open a tailgate or a deck lid. The base segment, the extendable rail, and the longitudinal carrier are located substantially entirely below the rearward structure of the vehicle in the stowed position. The extendable rail extends in a horizontal direction and is located behind the rearward structure of the vehicle in the transport position for transporting at least one bicycle.

19 Claims, 14 Drawing Sheets

(56) References Cited

U.S. PATENT DOCUMENTS

| | | | | |
|---|---|---|---|---|
| 3,794,227 A * | 2/1974 | Stearns | ............... | B60R 9/06 211/22 |
| 4,084,736 A * | 4/1978 | Jacobs, Jr. | ............... | B60R 9/06 224/492 |
| 4,403,716 A * | 9/1983 | Carlson | ............... | B60R 9/06 224/485 |
| 4,744,590 A * | 5/1988 | Chesney | ............... | B60R 9/06 224/520 |
| 5,096,102 A * | 3/1992 | Tolson | ............... | B60R 9/06 224/501 |
| 5,106,002 A | 4/1992 | Smith et al. | | |
| 5,190,195 A | 3/1993 | Fullhart et al. | | |
| 5,267,748 A * | 12/1993 | Curran | ............... | B25B 1/2484 224/402 |
| 5,368,209 A * | 11/1994 | Hill | ............... | B60R 9/065 224/402 |
| 5,373,978 A | 12/1994 | Buttchen et al. | | |
| 5,397,147 A * | 3/1995 | Ducharme | ............... | B25H 3/06 224/403 |
| 5,439,151 A * | 8/1995 | Clayton | ............... | B60R 9/065 224/282 |
| 5,445,300 A | 8/1995 | Eipper et al. | | |
| 5,460,304 A * | 10/1995 | Porter | ............... | B60R 9/06 224/485 |
| 5,489,110 A * | 2/1996 | Van Dusen | ............... | B60R 9/06 224/507 |
| 5,647,719 A | 7/1997 | Bowlen | | |
| 5,685,686 A * | 11/1997 | Burns | ............... | B60R 9/06 224/282 |
| 5,690,260 A * | 11/1997 | Aikins | ............... | B60R 9/10 224/504 |
| 5,695,103 A * | 12/1997 | Duvernay | ............... | B60R 9/10 224/502 |
| 5,699,985 A * | 12/1997 | Vogel | ............... | B60R 9/10 224/521 |
| 5,950,890 A * | 9/1999 | Darby | ............... | B60R 9/06 224/402 |
| 6,006,973 A * | 12/1999 | Belinky | ............... | B60R 9/06 224/500 |
| 6,099,035 A * | 8/2000 | Garvin, III | ............... | B60R 9/06 224/486 |
| 6,189,458 B1 * | 2/2001 | Rivera | ............... | B60N 3/001 108/150 |
| 6,199,735 B1 * | 3/2001 | Cothern | ............... | B60R 9/06 224/509 |
| 6,575,509 B1 | 6/2003 | Golden | | |
| 6,752,302 B2 * | 6/2004 | Anton | ............... | B60R 9/06 224/517 |
| 6,846,017 B2 * | 1/2005 | Martin | ............... | B60R 9/06 224/524 |
| 7,281,745 B1 | 10/2007 | Meinke et al. | | |
| 7,469,806 B2 * | 12/2008 | Garoffolo | ............... | B60R 9/042 224/310 |
| 7,766,202 B2 * | 8/2010 | Depot | ............... | B60R 9/06 224/504 |
| 8,011,543 B2 * | 9/2011 | Premartin | ............... | B60R 9/06 224/511 |
| 8,065,996 B1 * | 11/2011 | Neuvelt | ............... | A47J 37/0704 126/24 |
| 8,066,162 B2 * | 11/2011 | Chiang | ............... | B60R 9/06 224/321 |
| 9,120,429 B2 * | 9/2015 | Lungershausen | ............... | B60R 9/06 |
| 2006/0028036 A1 | 2/2006 | Chuang | | |
| 2007/0102465 A1 | 5/2007 | Wezyk et al. | | |
| 2008/0042419 A1 * | 2/2008 | Premartin | ............... | B60R 9/06 280/769 |
| 2008/0061543 A1 * | 3/2008 | Gardner | ............... | B60R 5/041 280/769 |
| 2009/0302078 A1 * | 12/2009 | Wang | ............... | B60R 9/06 224/502 |
| 2010/0001029 A1 * | 1/2010 | Tai | ............... | B60R 9/06 224/499 |
| 2010/0045012 A1 * | 2/2010 | Lungershausen | ............... | B60R 9/10 280/769 |
| 2010/0096424 A1 * | 4/2010 | Kuschmeader | ............... | B60R 9/10 224/509 |
| 2011/0011909 A1 * | 1/2011 | Liu | ............... | B60R 9/10 224/501 |
| 2011/0024472 A1 * | 2/2011 | Thompson | ............... | B60R 9/042 224/500 |
| 2011/0108592 A1 * | 5/2011 | Lee | ............... | B60R 9/06 224/488 |
| 2015/0224837 A1 * | 8/2015 | Anyan | ............... | B60R 9/06 280/504 |
| 2015/0321620 A1 * | 11/2015 | Lungershausen | ............... | B60R 9/06 224/497 |
| 2016/0046230 A1 * | 2/2016 | Choi | ............... | B60Q 1/30 340/435 |
| 2016/0052457 A1 * | 2/2016 | Cha | ............... | B60R 9/06 224/489 |
| 2016/0052458 A1 * | 2/2016 | Cha | ............... | B60R 9/10 414/462 |
| 2016/0052459 A1 * | 2/2016 | Cha | ............... | B60R 9/06 224/489 |
| 2016/0068110 A1 * | 3/2016 | Prescott | ............... | B60R 9/06 224/521 |
| 2016/0090266 A1 * | 3/2016 | Brinkerhoff | ............... | B65H 49/32 242/557 |
| 2016/0096482 A1 * | 4/2016 | Cha | ............... | B60R 9/10 224/496 |
| 2016/0096483 A1 * | 4/2016 | Cha | ............... | B60R 9/10 224/496 |
| 2016/0152190 A1 * | 6/2016 | Lee | ............... | B60R 9/10 224/489 |
| 2016/0200157 A1 * | 7/2016 | Marmon | ............... | B60R 9/06 280/491.3 |
| 2016/0297371 A1 * | 10/2016 | Cha | ............... | B60R 9/10 |
| 2016/0362064 A1 * | 12/2016 | Singleton | ............... | B60R 9/06 |
| 2017/0015255 A1 * | 1/2017 | Cha | ............... | B60R 9/10 |
| 2017/0072866 A1 * | 3/2017 | Cha | ............... | B60R 9/10 |
| 2017/0072867 A1 * | 3/2017 | Cha | ............... | B60R 9/10 |

FOREIGN PATENT DOCUMENTS

| | | |
|---|---|---|
| DE | 10231963 A1 | 2/2004 |
| DE | 10252132 A1 | 5/2004 |
| DE | 10338724 A1 | 4/2005 |
| DE | 102004008530 A1 | 9/2005 |
| DE | 102004021709 A1 | 12/2005 |
| DE | 102004022835 A1 | 12/2005 |
| DE | 102009030573 A1 | 12/2010 |
| FR | 2829082 A1 | 3/2003 |
| JP | H08175276 A | 7/1996 |
| JP | 8282389 A | 10/1996 |
| NL | 1037519 C | 6/2011 |

OTHER PUBLICATIONS

Russian Patent Office, Russian Office Action Application No. 2009141709, dated Oct. 20, 2011.

* cited by examiner

LOAD CARRIER FOR A MOTOR VEHICLE

CROSS-REFERENCE TO RELATED APPLICATIONS

This application is a divisional application of U.S. patent application Ser. No. 12/595,579 filed on Oct. 12, 2009, which is National Stage of International Application No. PCT/EP2008/051614 filed on Feb. 11, 2008, which claims priority to German Application No. 102007017164.3 filed on Apr. 12, 2007. The entire disclosures of each of the above applications are incorporated herein by reference.

TECHNICAL FIELD

The invention relates to a retractable load carrier for a motor vehicle, in particular for a passenger car.

BACKGROUND

Known from DE 102 31 963 A1 is such a load carrier. The load carrier is guided on telescoping rails through the bumper. It is pulled out of the rearward structure of the vehicle for use.

BE 1012537 A6 discloses a load carrier that can be pulled out of the rearward structure of the vehicle on rollers. The load carrier extends nearly over the entire width of the vehicle, so that the entire bumper is pulled out.

At least one object of one embodiment of the invention is to further develop a load carrier of the kind mentioned at the outset, with which, given a vehicle equipped with a tailgate, the tailgate can still be opened even with the load carrier loaded. In addition, other objects, desirable features, and characteristics will become apparent from the subsequent summary and detailed description, and the appended claims, taken in conjunction with the accompanying drawings and this background.

SUMMARY

A first aspect of the invention relates to a load carrier for a motor vehicle for retraction from its rear structure. In the load carrier, a supporting frame is accommodated on at least one longitudinally displaceable oblong element equipped with a swiveling axis and guided through the bumper of the motor vehicle, or located under the bumper of the motor vehicle.

The mentioned solution provides for at least one oblong element, which is guided through the bumper so that it can shift along its longitudinal direction. Secured to the oblong element is the supporting frame, to which the items to be transported can be attached. Therefore, the load carrier is used in a first variant just like a drawer, which can be pushed into and pulled out of the rear structure of the vehicle by way of the bumper. In the second variant, which is geared toward vehicles with a large ramp angle, e.g., all-terrain vehicles, the oblong element can be guided under the bumper like a drawer.

Because the oblong element not only can shift in a longitudinal direction, but also has a swiveling axis, a tailgate of the motor vehicle can be opened even once the items to be transported have been secured to the load carrier, so that the interior of the luggage compartment is always accessible. Handling the items to be transported by way of a combined tilting/sliding mechanism enables a more compact structural design for the load carrier (in the longitudinal direction of the vehicle) by comparison to cases where the latter can only be longitudinally shifted. This limits the weight of the load carrier, while only slightly changing the vehicle characteristics under a full load.

The load carrier can be used or is designed to transport two or possibly four bicycles oriented transverse to the longitudinal direction of the vehicle, while still being able to open the tailgate even under a full load in terms of the above statements. Of course, the load carrier can also be used to transport other loads. Just to keep things more understandable, reference will in the following always be made to bicycles, even though this is not to be construed as limiting in the sense that the load carrier is suitable only for bicycles.

Such a load carrier is particularly suitable for vehicles with a tailgate, e.g., station wagons, minivans, vans, SUV's, caravans, all-terrain vehicles, etc. In such vehicles, the danger that the load carrier will unintentionally rest on the floor is slight owing to the existing ground clearance. As will be explained in even greater detail below, a corresponding configuration of the load carrier can also be used for a lower body floor to ensure that the load carrier will not be damaged in this way.

A second embodiment provides for a trapezoidal, oblong element, for example precisely one trapezoidal, oblong element. This shape is geometrically simple, and can be realized, for example, through the use of deep-draw materials made of sheet metal or plastic, or of fiberglass-reinforced materials.

A third embodiment provides at least one rail as the oblong element, for example exactly two rails. The rails have a robust and simple construction, which is joined with the body floor, e.g., welded or screwed, and can be used to some extent to set the vertical position of the load carrier, so that the load carrier is arranged in the plane of the bumper. At the same time, known concepts can be drawn upon for preparing a swiveling axis.

Another embodiment provides at least one conically incoming tube as the oblong element, for example exactly two conical tubes. The statements in the previous paragraph apply analogously.

The load carrier can be pulled out or pushed in on rollers, as in BE 1012537 A6. As an alternative, the at least one oblong element can be telescoping, as in DE 102 52 132 A1, wherein less space is required than for an oblong element on rollers. These two possibilities can also be combined, and exist for all aforementioned models of the oblong element.

As stated above, the swiveling axis is used to swivel the items being transported away from the rear structure of the vehicle with the load carrier fully loaded, thereby making the luggage compartment accessible. It here goes without saying that the swiveling axis runs inclined relative to the longitudinal direction of the vehicle. The tailgate is then to be opened the soonest with the load carrier full, when the swiveling axis runs in the transverse direction of the vehicle. If the load carrier here has at least two oblong elements, i.e., two rails, these exhibit a shared swiveling axis, which then runs in the transverse direction of the vehicle, for example.

In another embodiment, the oblong element encompasses a base element which, when pulled completely out of the rear structure of the vehicle, defines a first position of use for the oblong element. The load carrier further encompasses an extension that is joined with the base element and defines a second position of use.

The base element can be at least one rail (or a conical tube), for example, which defines a first position of use when pulled out of the rear structure of the vehicle. The first position of use can be characterized by the fact that two bicycles can be transported therein with the load carrier. By contrast, if the extension is used, for example as the result of its telescoping capability enabling it to be pulled out of the base element, the load carrier becomes longer in the longitudinal direction of the vehicle. This yields the second position of use, for example in which four bicycles can be transported with the load carrier. The swiveling axis then makes it possible to swivel two bicycles away from the tailgate in the first position, and four bicycles in the second position, so that the tailgate can be opened in both cases, and the respective luggage compartment is accessible.

Because the oblong element in this embodiment consists of two components (base element and extension), the length of the load carrier adjusts to the dimensions of the loads actually to be transported. It is here possible to detachably secure the extension to the base element, and in this regard present it as a separate section. The customer need not purchase the extension with the vehicle if this section is not required, but can instead buy it later when actually needed. As an alternative, the base element and extension are rigidly joined together.

As evident from the above statements, the swiveling axis is part of the extension and/or base element.

For example, the swiveling axis is located toward the back end of the extension. In this case, the swiveling axis can also be longitudinally shifted. While configuring the load carrier, this makes it possible to put the swiveling axis at the center of gravity of the load to be transported, so that little force is required for outward tilting. It is here also possible for the center of gravity to lie above the swiveling axis for both two and four bicycles on the load carrier, making it easy to tilt the load outward. All told, then, an embodiment in which the swiveling axis is part of the extension affords the chance to provide a load carrier with a load that is very easy to tilt, thereby increasing its ease of handling.

Further provided is an embodiment that provides a sensor that can be used to determine whether the load, e.g., two or four bicycles, has been swiveled out.

The outward swiveling or tilting is used to open the tailgate of the vehicle, so as to provide access to the luggage compartment. In the resultant tilted position of the lad carrier, safety reasons generally make it impermissible to continue driving. The sensor, e.g., a mechanical, optical or magnetic sensor, can be used to determine whether or not continued driving is allowed. With the load carrier tilted, the electronic systems in the vehicle can entirely prevent continued driving or reduce the speed, usually in tandem with an optical and possibly an acoustic warning signal.

The extension can be secured to the base element in various ways.

One way is to hinge the extension to the base element. For example, if both the base element and extension are rails, the latter can be aligned parallel to each other and positioned relative to each other by means of a spacing element. To this end, the spacer element is hinged both to the base element and extension. Without the load tilting away, this hence defines two transport planes, e.g., a first, lower transport plane for transporting two bicycles, and a second, higher transport plane for transporting two additional bicycles. The second transport plane yields a consistently sufficient ramp angle for the rear load carrier area, thereby enabling safe travel.

A second way is to provide a foldout extension. In this case, the base element is equipped with the indicated swiveling axis, and the extension is activated by way of a flap mechanism. The extension can here also be incrementally used for securing the loads.

In another embodiment, the load carrier has an oblong element consisting of three mutually telescoping rails, wherein the innermost rail has a rotatable encompassing rail.

This configuration yields an extremely compact structure for the oblong element, with the ability to transport two bicycles. Outward tilting here takes place by means of the encompassing rail.

The last embodiment can be enhanced by inserting a step-shaped expansion part into the innermost rail.

The expansion part can be latched in the innermost rail, and makes it possible to transport two bicycles and tilt them outwardly if needed. The two oblong elements here define a first transport plane, and the expansion part a second, higher transport plane. The second transport plane opens up more ground clearance in the rear load carrier, with a smaller danger that the latter will inadvertently become situated on the roadway.

The rotational axis of the expansion part can lie roughly under the center of gravity in this structural design during the transport of four identical bicycles. In this regard, the totality of four bicycles can be swiveled away from the tailgate applying only a little force.

Also provided is an embodiment in which the supporting frame encompasses a transverse web secured to a rotating bicycle holder. The bicycle holder can be designed to fix a pedal rod of a bicycle in place, and stowed away in such a way as to economize on space due to the rotating design by retracting the load carrier into the rearward structure of the vehicle. When in use, it can be aligned in the longitudinal direction of the vehicle, and accommodate pedal rods. When not in use, it can swivel into a position parallel to the transverse rod, and in so doing takes up hardly any space when stowing the load carrier in the luggage compartment.

In a second aspect, the invention relates to a motor vehicle, in particular a passenger car, with a load carrier according to one of the preceding embodiments. The passenger care can here have an upwardly swiveling tailgate, as is the case among other things in vans, minivans, caravans, all-terrain vehicles or station wagons.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1A:
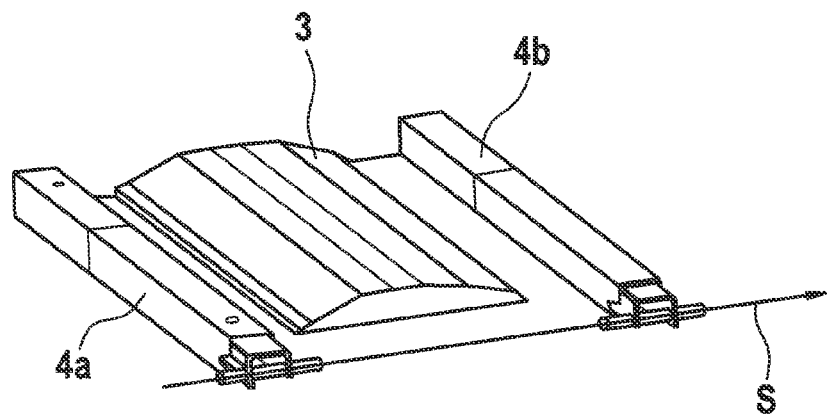
FIG. 1a to FIG. 1c is a first embodiment of an oblong element of the load carrier.
Figure 1B:
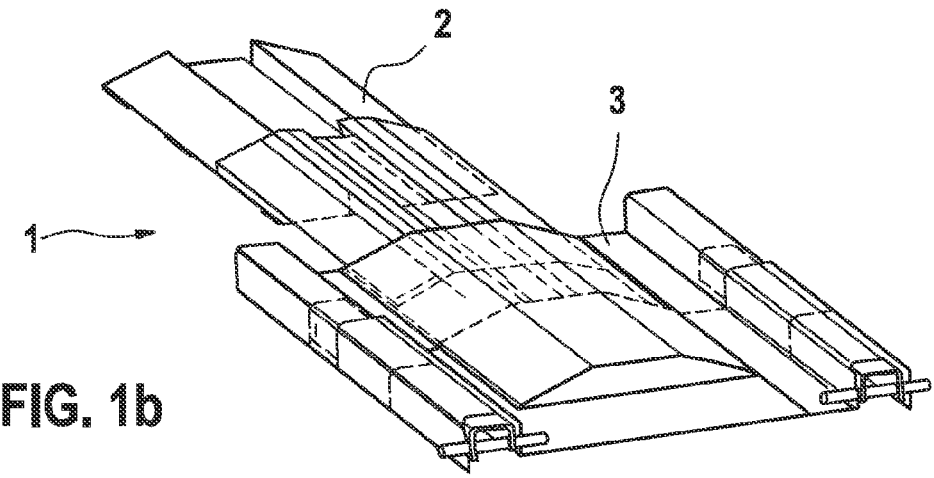
Figure 1C:
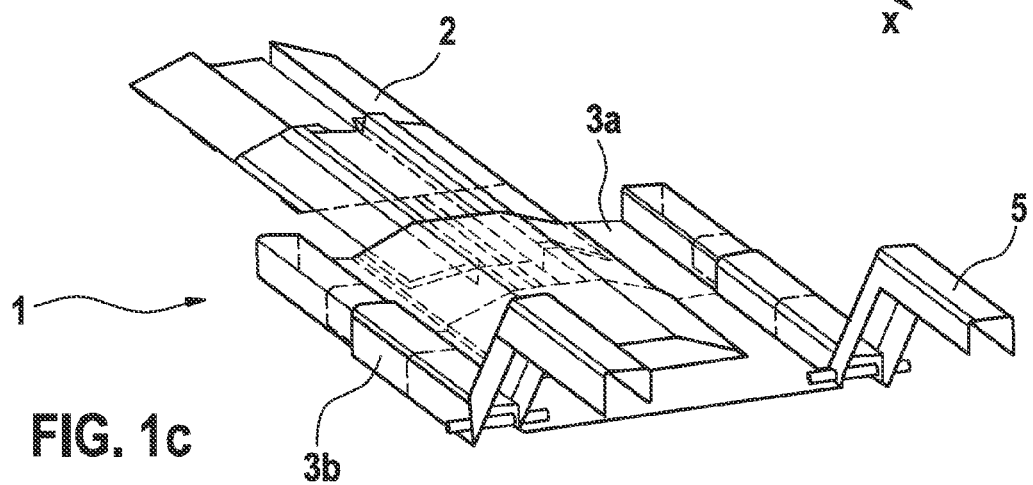

The figures generally use the same reference numbers to denote the same objects; FIG. 1a to 1c show a first embodiment of an oblong element 1 for a load carrier. It has a trapezoidal base element 2, which is joined with the body floor of the vehicle (not shown), and the central area of which can carry an extension 3.

The oblong element 1 can telescope in the longitudinal direction of the vehicle. The x-axis of the recorded Cartesian coordinate system runs parallel hereto in the direction of the rear side of the vehicle, while the y-axis runs in a transverse direction of the vehicle, from the left to right side of the vehicle.

The oblong element 1 is further secured to a supporting frame, which is used to hold the items being transported. Since the supporting frame is not the focal point of this invention, it structural configuration will not be taken up in any greater detail. For example, the supporting frame can be the one described in DE 102 52 132 A1 or DE 102 31 963 A1.

Situated on either side of the extension 3 are rails 4a, 4b, into which an expansion part 5 designed as a plug-in section can be introduced. The extension 3 consists of two parts 3a and 3b, of which part 3b can be rotated around the swiveling axis S, but not part 3a. As a result, the expansion part 5 can be turned together with part 3b of the extension 3 around the swiveling axis S aligned parallel to the y-axis.

In the embodiment on FIG. 1a to 1c, for example, two bicycles can be placed above part 3b, and two additional bicycles above the expansion part 5. The bicycles are then arranged on two transport planes, wherein the first transport plane is defined by rails 4a and 4b, and the second transport plane by the upper horizontal section of the step-shaped expansion part 5. The second, higher transport plane prevents the rear area of the load carrier from unintentionally resting on the roadway while driving up hills.

In this embodiment, the center of gravity of the bicycles to be transported is above the swiveling axis S. As a result, it only takes a minimal force to tilt away the tailgate of the vehicle located in the (x) direction.

Figure 2:
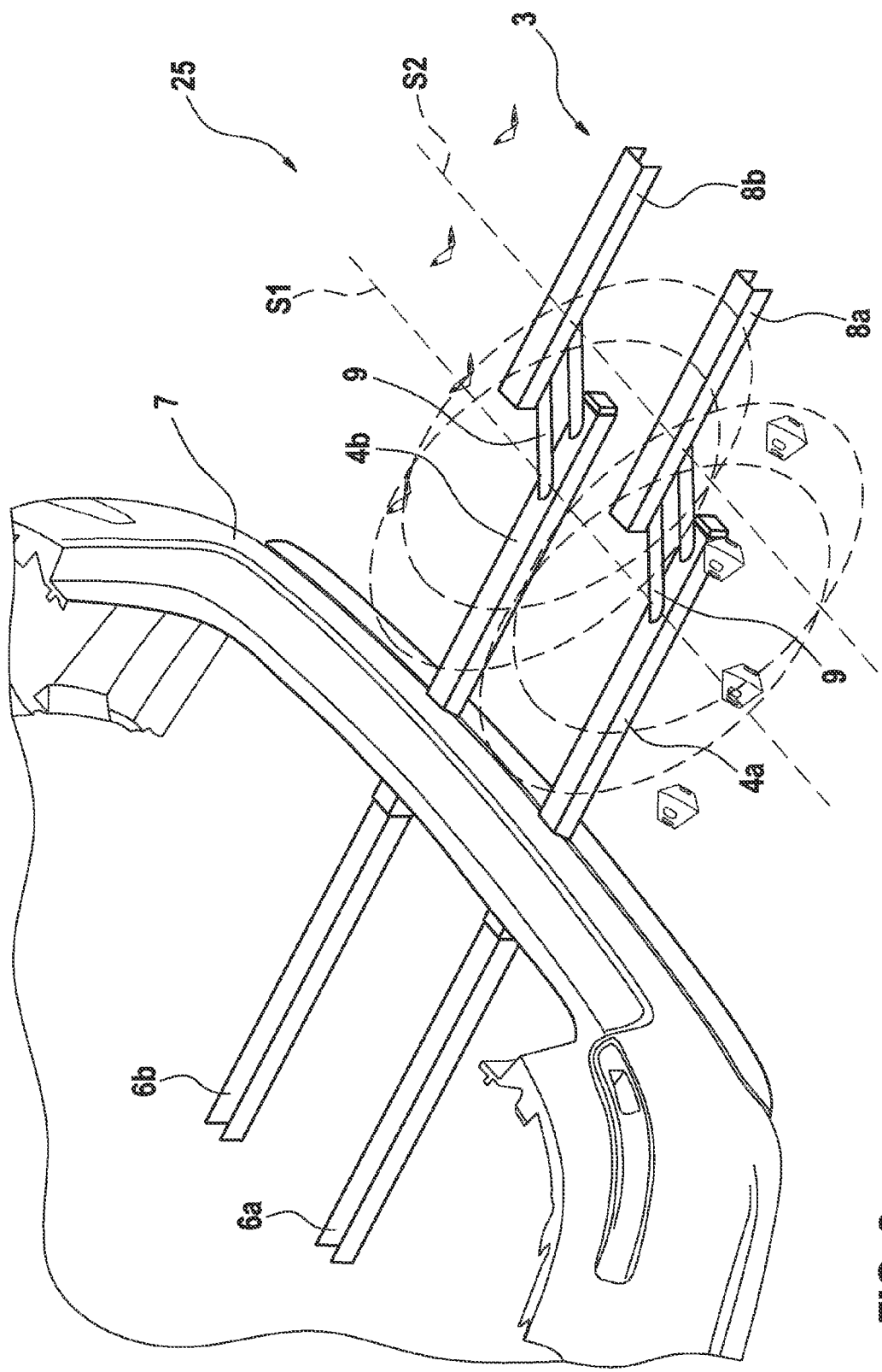
FIG. 2 is a second embodiment of an oblong element of the load carrier.

FIG. 2 shows a second embodiment of an oblong element 1 of the load carrier 25. This case involves two rails 4a, and 4b, which can be telescoped into the longitudinal carriers 6a or 6b of the vehicle, wherein they are passed through the bumper 7. The extension 3 consists of two rails 8a and 8b, which each are hinged to the rails 4a or 4b by way of a spacer element 9. Among other things, the spacer element 9 can here be swiveled around axis S1 relative to the rails 4a and 4b. Among other things, it can be swiveled around axis S2 relative to rails 8a and 8b.

The figure shows the extension 3 in its position of use, in which two bicycles can be transported above the base element 1, defined by rails 4a and 4b, and two bicycles above the extension 3 defined by rails 8a and 8b. If the load carrier is not used, the extension 3 is pivoted to the base element 1, lies flush upon it, and the resultant unit is pushed into the rearward structure of the vehicle through the bumper 7.

Another way to configure the 4-joint 4a, 4b, 8a, 8b, 9 shown on FIG. 2 is to first move it into the position depicted on FIG. 2 as described above, and then shoving the rails 4a, 4b into the rearward structure of the vehicle. In this case, the extension 8a, 8b can be used for transporting two bicycles.

The embodiment on FIG. 2 represents a space-saving option for accommodating the extension 3 for cases in which the load carrier is not required and has been retracted into the rearward structure of the vehicle. The statements with reference to FIG. 1a-1c apply with respect to holding the items being transported, e.g., two or four bicycles, on two transport planes.

Figure 3A:
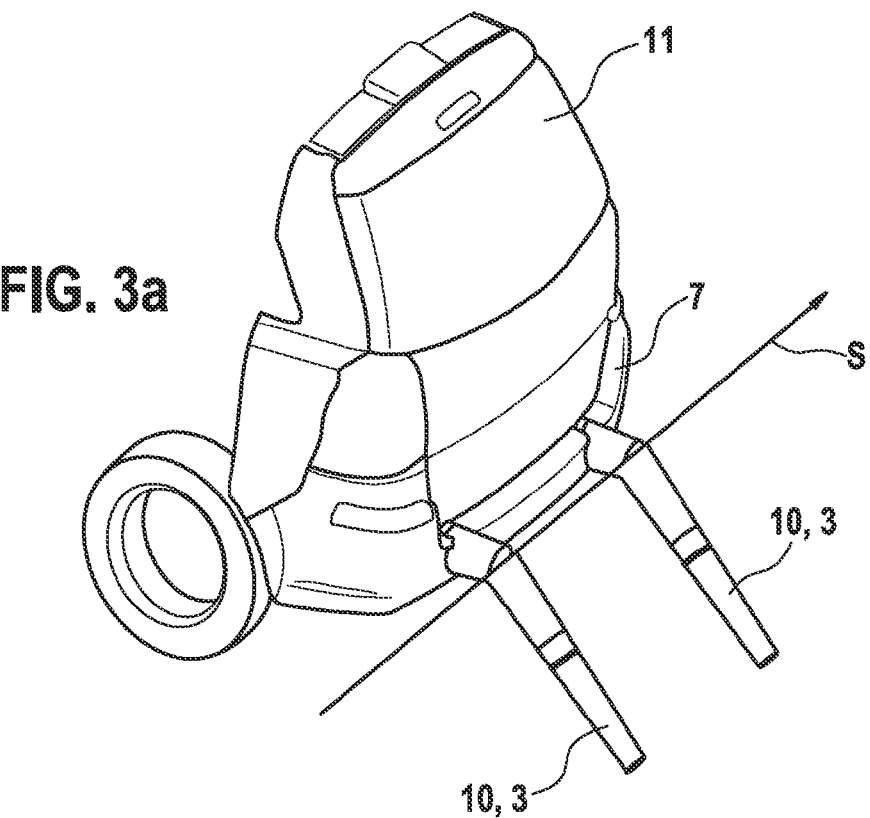
FIG. 3a and FIG. 3b is a third embodiment of an oblong element of the load carrier.
Figure 3B:
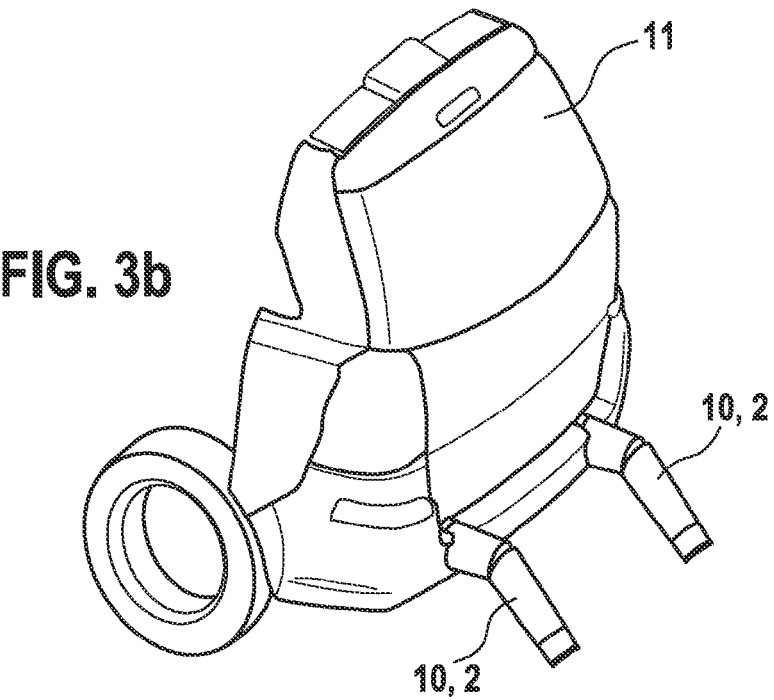

FIGS. 3a and 3b show another embodiment of the oblong element 1, in which the additional parts of the load carrier 25 are not shown for the sake of clarity, as was already the case on FIG. 1a-1c as well as FIG. 2. Instead of two rails, this embodiment depicts two conical tubes 10 in the bumpers 7 of the motor vehicle 11. The conical tubes 10 can be rotated around the swiveling axis, and exhibit a telescoping design. As evident from a comparison of FIGS. 3a and 3b, the conical tubes 10 have a base element 2 and an extension 3, wherein the extension 3 is telescopically housed in the base element 2.

Figure 4:
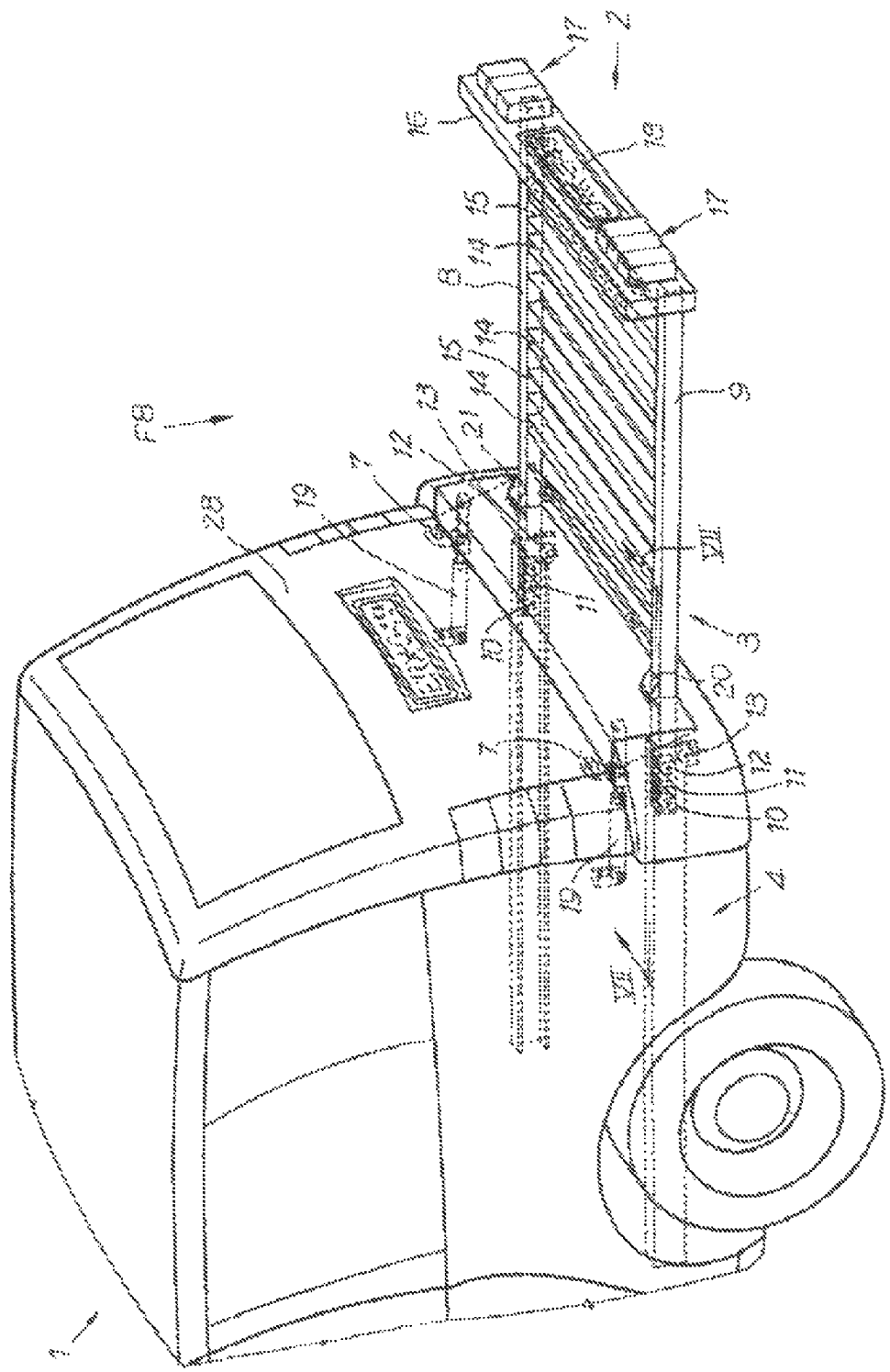
FIG. 4 is a load carrier according to prior art.
Figure 6:
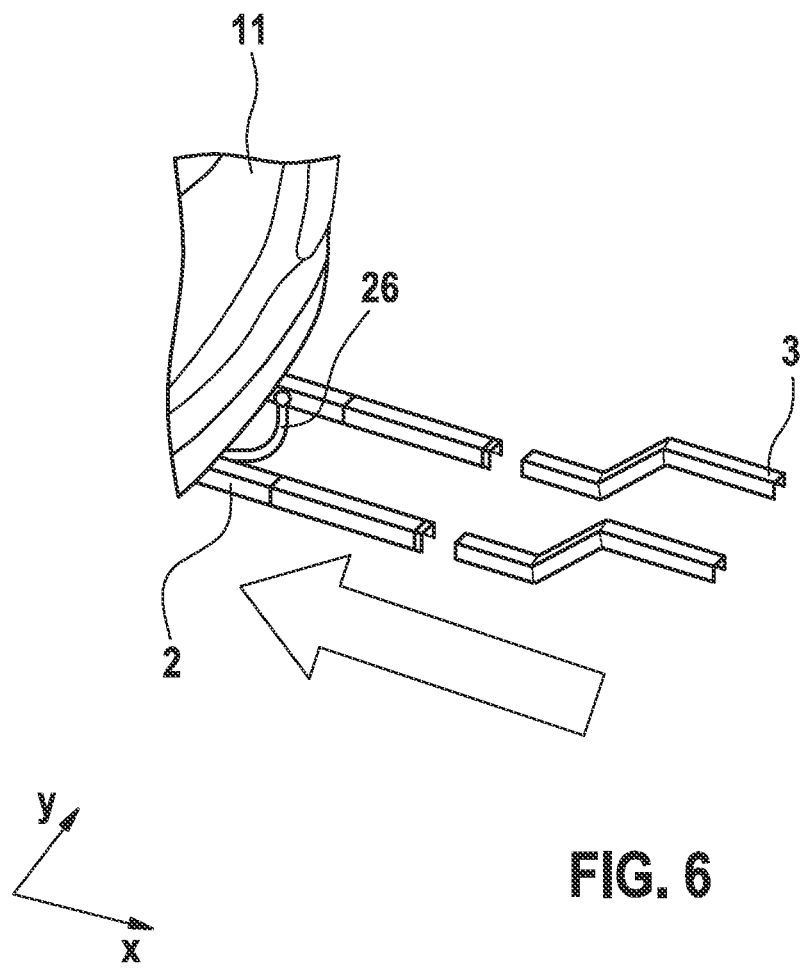
FIG. 6 is an extension for an oblong element of the load carrier.

FIG. 4 shows prior art, specifically FIG. 6 in BE 1012537 A6. The load carrier (reference number 2) is here guided into the vehicle on rollers (reference numbers 10, 11, 12). Such a roller configuration can also be used in the present invention for accommodating the oblong element 1.

Figure 5A:
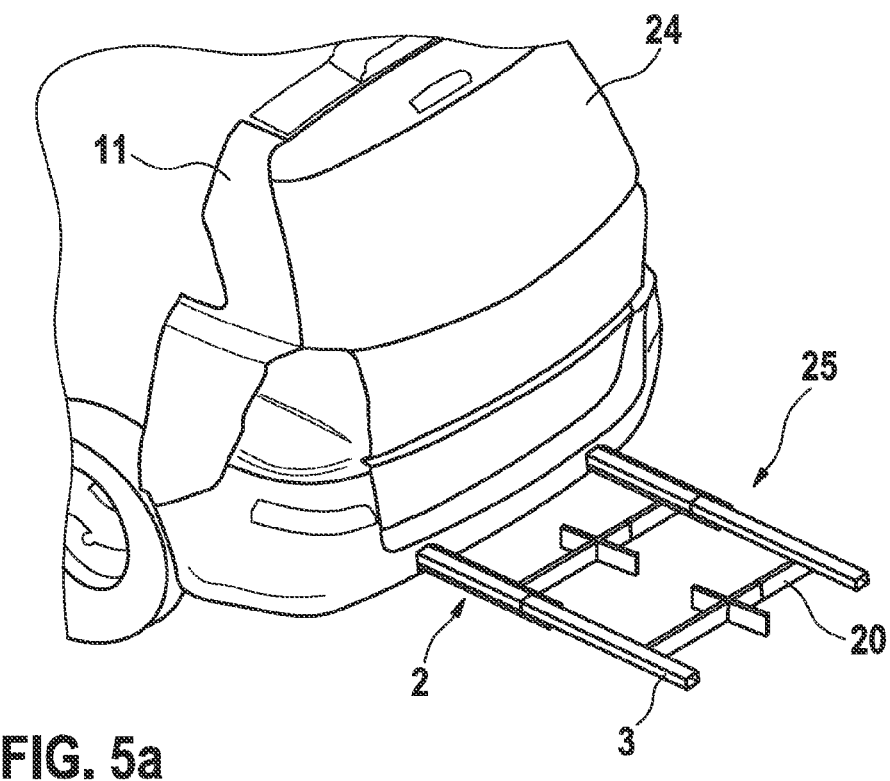
FIG. 5a and FIG. 5b is a fourth embodiment of an oblong element of the load carrier.
Figure 5B:
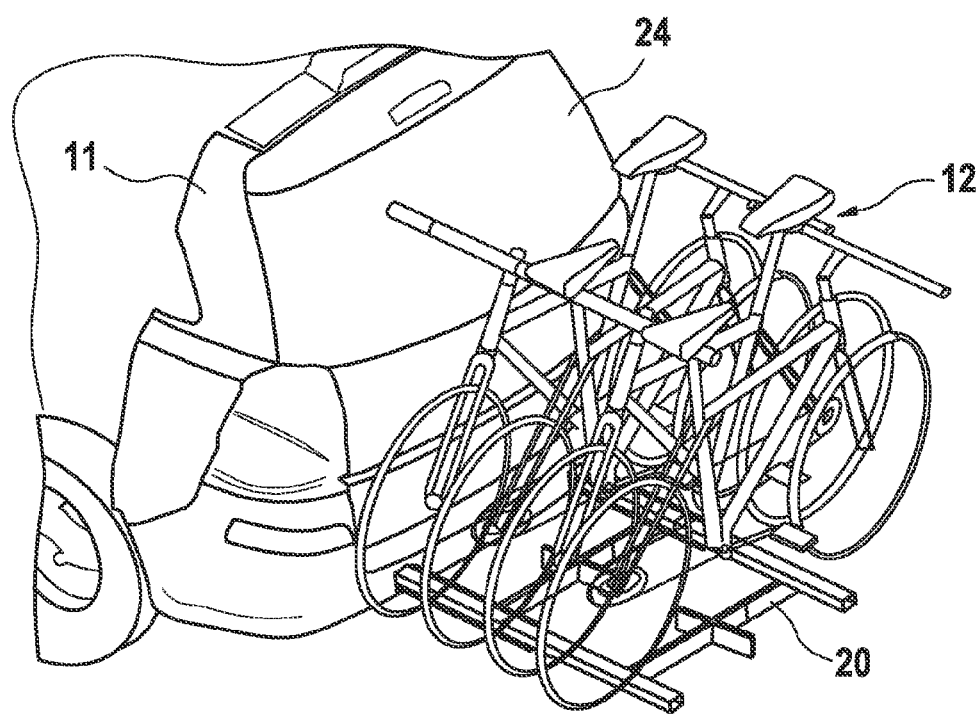

FIGS. 5a and 5b show another embodiment of an oblong element 1 of the load carrier. The oblong element 1 here has a u-shaped base element 2 with a u-shaped extension 3 telescoped therein. As particularly evident from FIG. 5b, the oblong element 1 can be used to transport a total of four bicycles 12.

FIG. 6 shows an embodiment in which the extension 3 is designed as a step-shaped plug-in section, which can also be purchased aftermarket, and can be introduced into the base element 2 in the direction of the arrow. As a result, the extension 3 is detachably secured, so that the load carrier is not in the way when using the trailer coupling 26.

Figure 7:
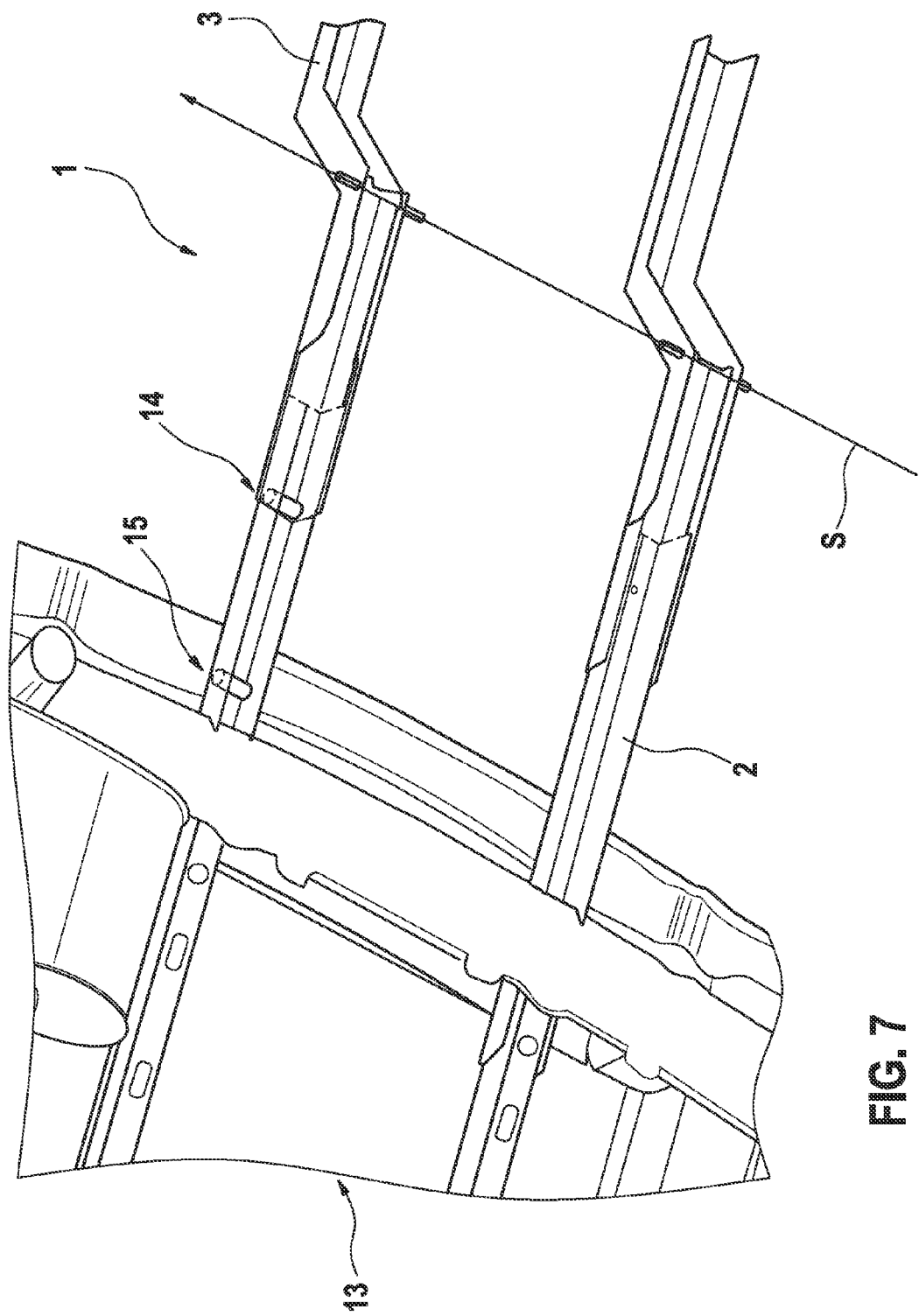
FIG. 7 is the extension on FIG. 6 during assembly.
Figure 8A:
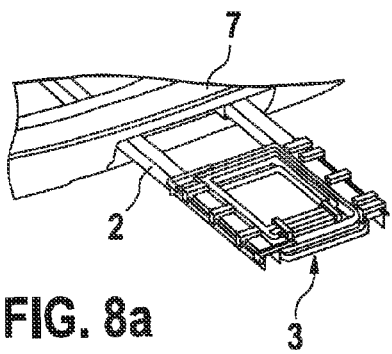
FIG. 8a to FIG. 8f is a fifth embodiment of an oblong element of the load carrier.
Figure 8B:
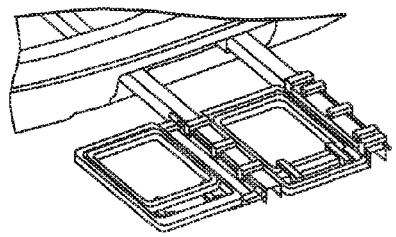
Figure 8C:
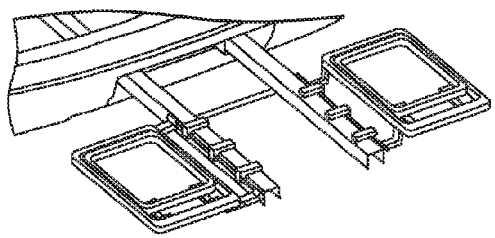
Figure 8D:
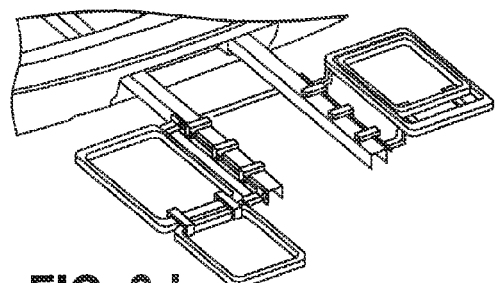
Figure 8E:
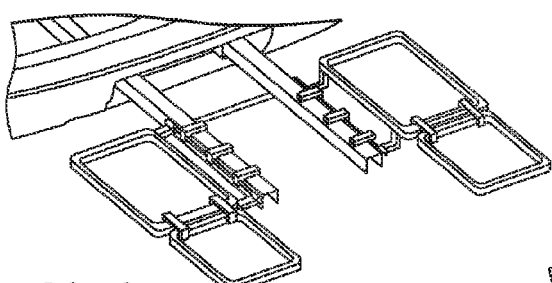
Figure 8F:
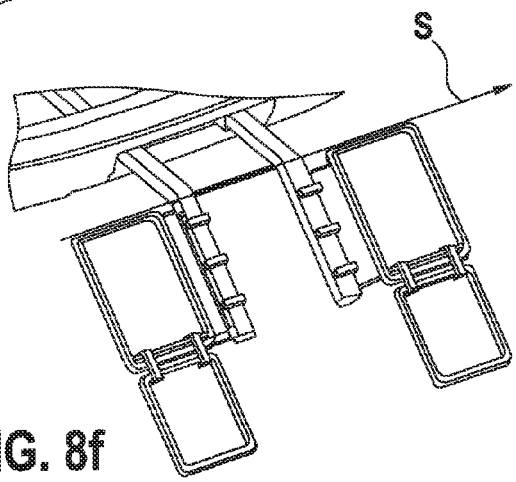

FIG. 7 shows the embodiment on FIG. 6 at an incline from below, i.e., viewed at an inclination toward the bottom side of the body floor 13. The vehicle-side end of the extension 3 has an element 14 that is detected by the sensor 15 in the base element 2 once the extension 3 is tightly adjacent enough. This is only the case if the extension 3 is not swiveled around the swiveling axis S. Therefore, the vehicle is allowed to drive if the sensor 15 detects the element. If the element 14 is not detected, the outwardly swiveled extension 3 does not permit driving, and a corresponding signal is sent to the onboard electronic system of the vehicle. An optical or acoustic warning signal can be output accordingly, or the drive can be prevented entirely.

FIGS. 8a-8f show the case of a base element 1 with a foldout extension 3. The latter is pulled out of the bumper 7 with the base element 2, see FIG. 8a. The other FIG. 8b to 8f show how the foldout extension 3 is folded out in chronological sequence.

Figure 9A:
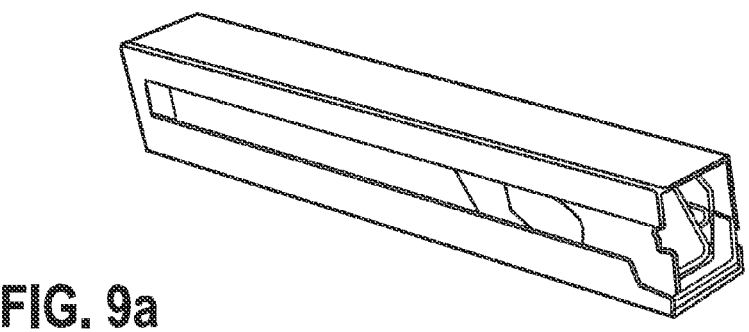
FIG. 9a to FIG. 9e is sixth embodiment of an oblong element of the load carrier.

FIGS. 9a to 9e show an oblong element 1 designed as three rails telescoping one into the other. FIG. 9a here shows the outermost, space-saving state while pulling the load carrier out of the rearward structure.

Figure 9B:
Figure 9B:
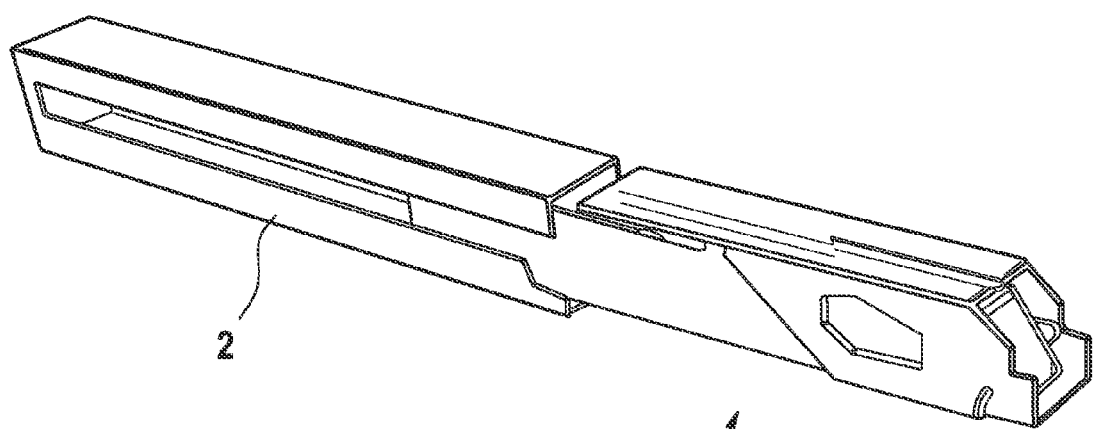

The extension 3 is pushed out in the x-direction on FIG. 9b. This position is the transport state of the load carriers for cases in which two bicycles are being transported.

Figure 9C:
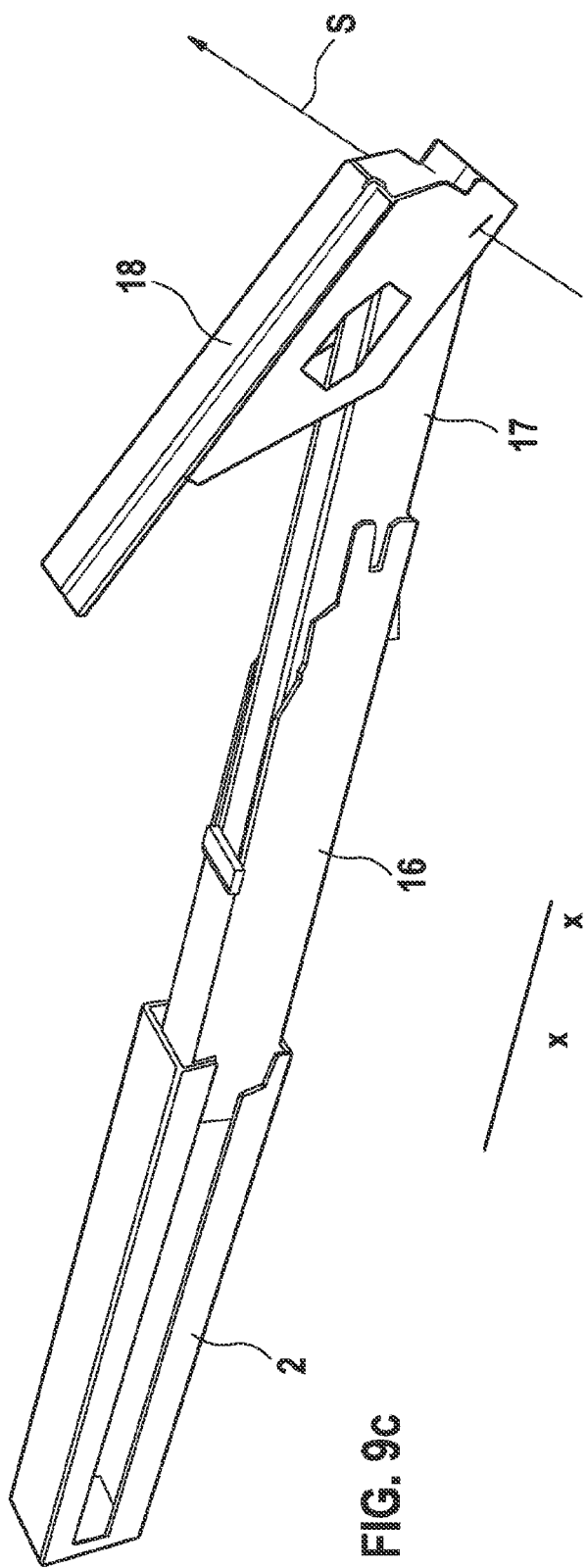

FIG. 9c corresponds to FIG. 9b, with the difference that the enveloping rail 18 is swiveled around the axis 8 clockwise. This yields the position in which the two bicycles are swiveled away from the tailgate, and the luggage compartment is accessible. As evident here, the extension 3 consists of an outer rail 16 and inner rail 17, meaning that the oblong element 1 is made up of three rails pushed into each other.

Figure 9D:
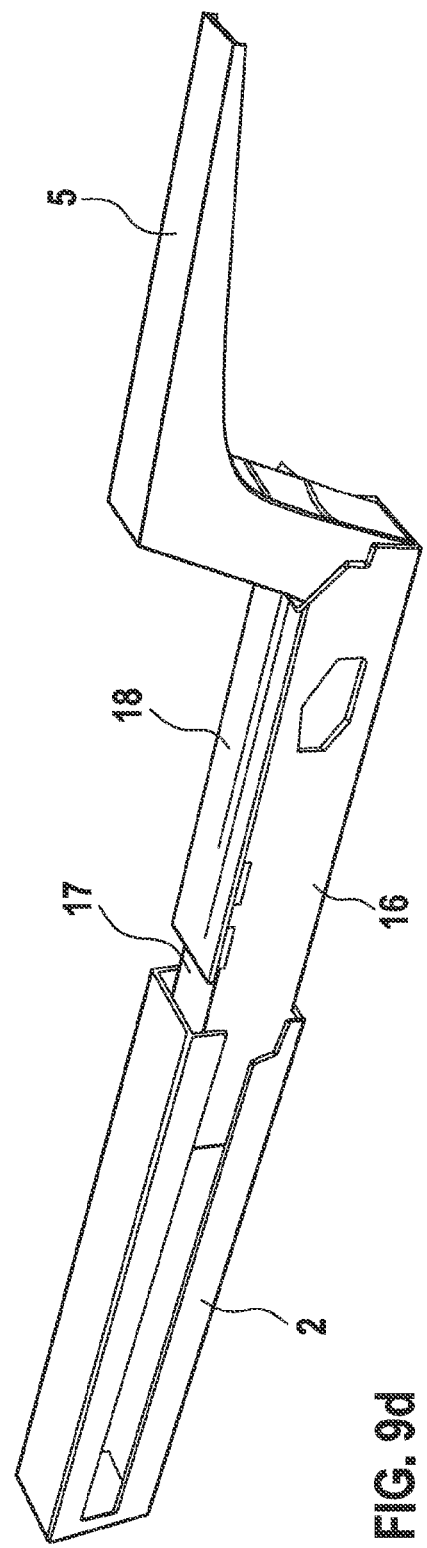

FIG. 9d corresponds to FIG. 9b, with the difference that an expansion part 5 is inserted into the extension 3. The upper, horizontally proceeding area of the expansion part 5 defines a second transport plane, with which two additional, and hence a total of four, bicycles can be transported. FIG. 9d here shows the transport state of the load carrier.

Figure 9E:
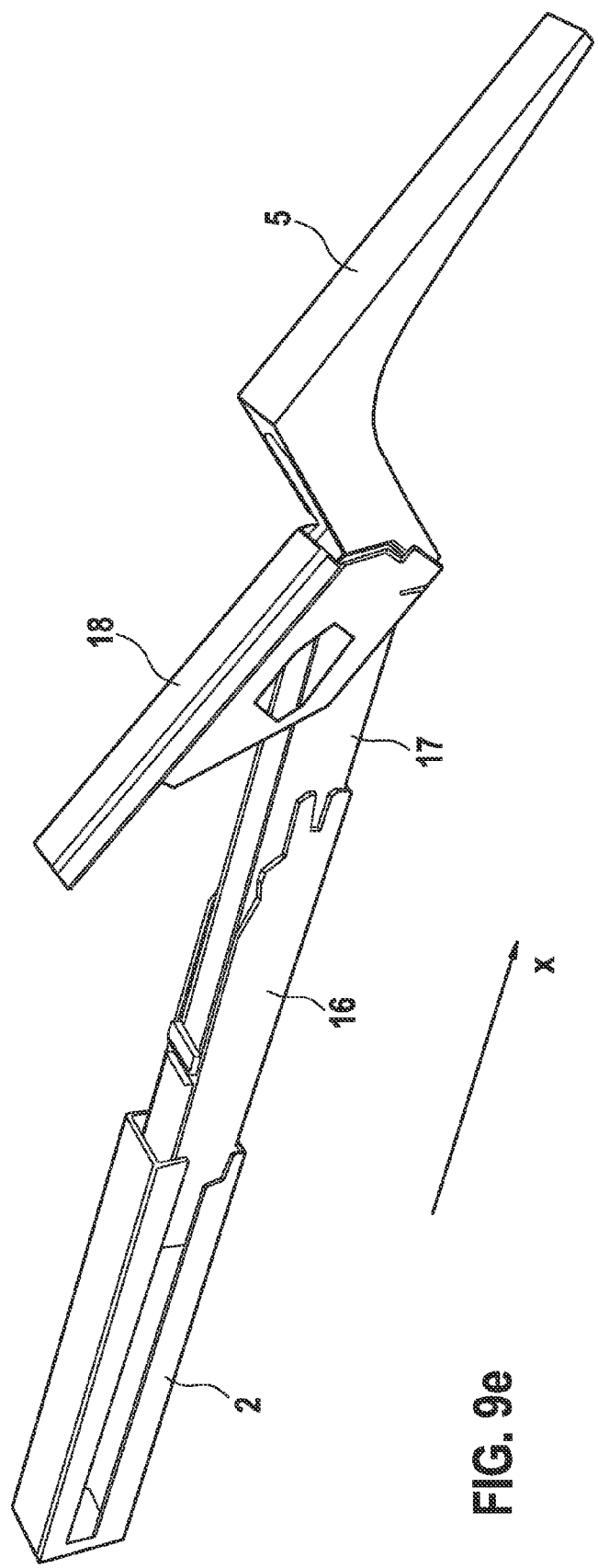

Swiveling the enveloping rail 18 on FIG. 9d along with the enveloping rail 18 around the axis clockwise results in the state on FIG. 9e. The latter shows the state of the oblong element 1 with a total of four tilted bicycles.

The expert will recognize that the oblong element 1 shown on FIG. 9a-9e can also do without the innermost rail 17. The rail 17 is used to lengthen the oblong element 1 in the x-direction, so that the load (e.g., four bicycles) remains outside the envelope 23 of the tailgate 24. However, the envelope 23 varies as a function of vehicle type, depending among other things on the position of the tailgate swiveling axis in the x direction. If the tailgate swiveling axis is farther away from the rearward structure, the oblong element 1 need not be so long, and the innermost rail 17 can be done without. Much the same applies when the load in this combined tilting/shifting mechanism is tilted away from the tailgate 24 at a greater angle.

Figure 10:
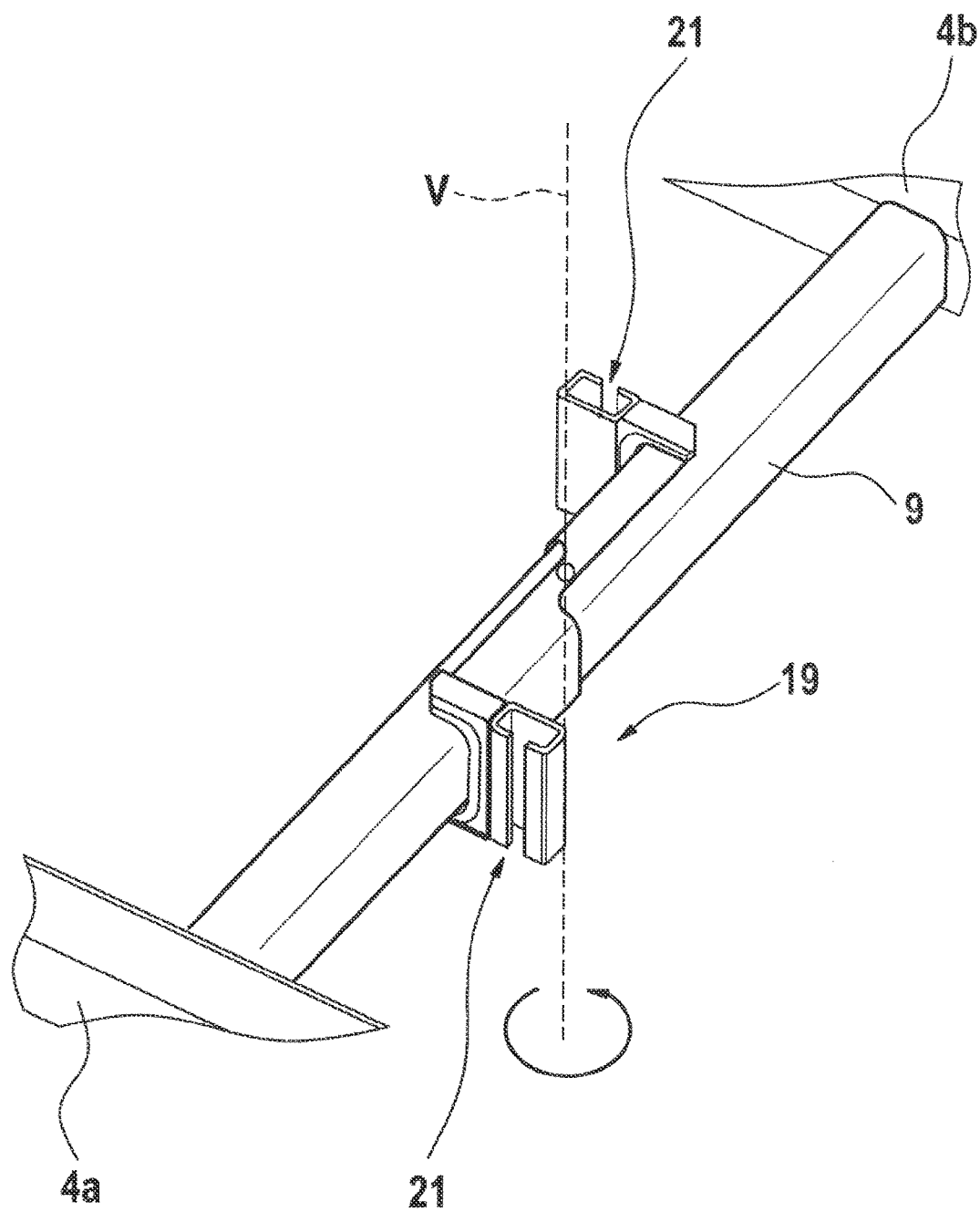
FIG. 10 is a rotatable bicycle holder on a transverse web of the load carrier.
Figure 11:
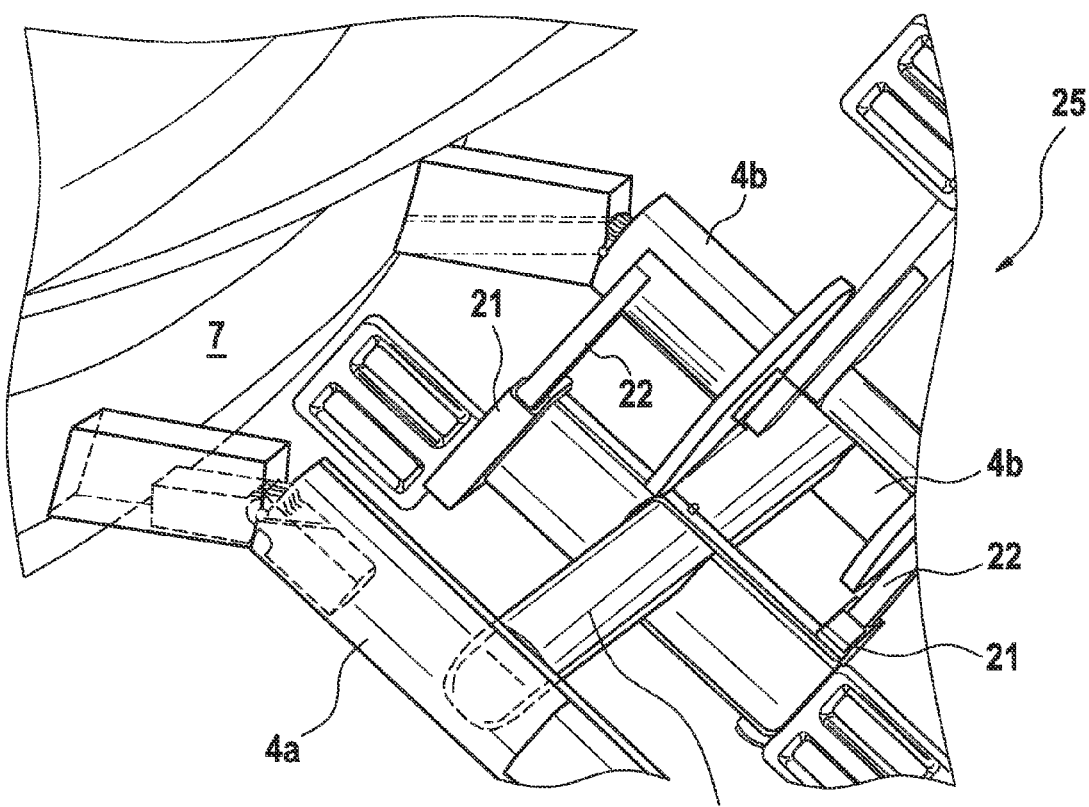
FIG. 11 is a detailed view of the swiveling axis area with the pedal rod of a bicycle, which is fixed with the bicycle holder on FIG. 10.

FIG. 10 further shows a rotatable bicycle holder 19 on a transverse web 20 of the load carrier. The bicycle holder 19 is mounted so that it can rotate around the vertical axis V, and its two ends exhibit a rail-shaped receptacle 21, which accommodates a pedal rod 22 of a bicycle 12, see FIG. 11, so as to fix it to the load carrier 25.

Figure 12:
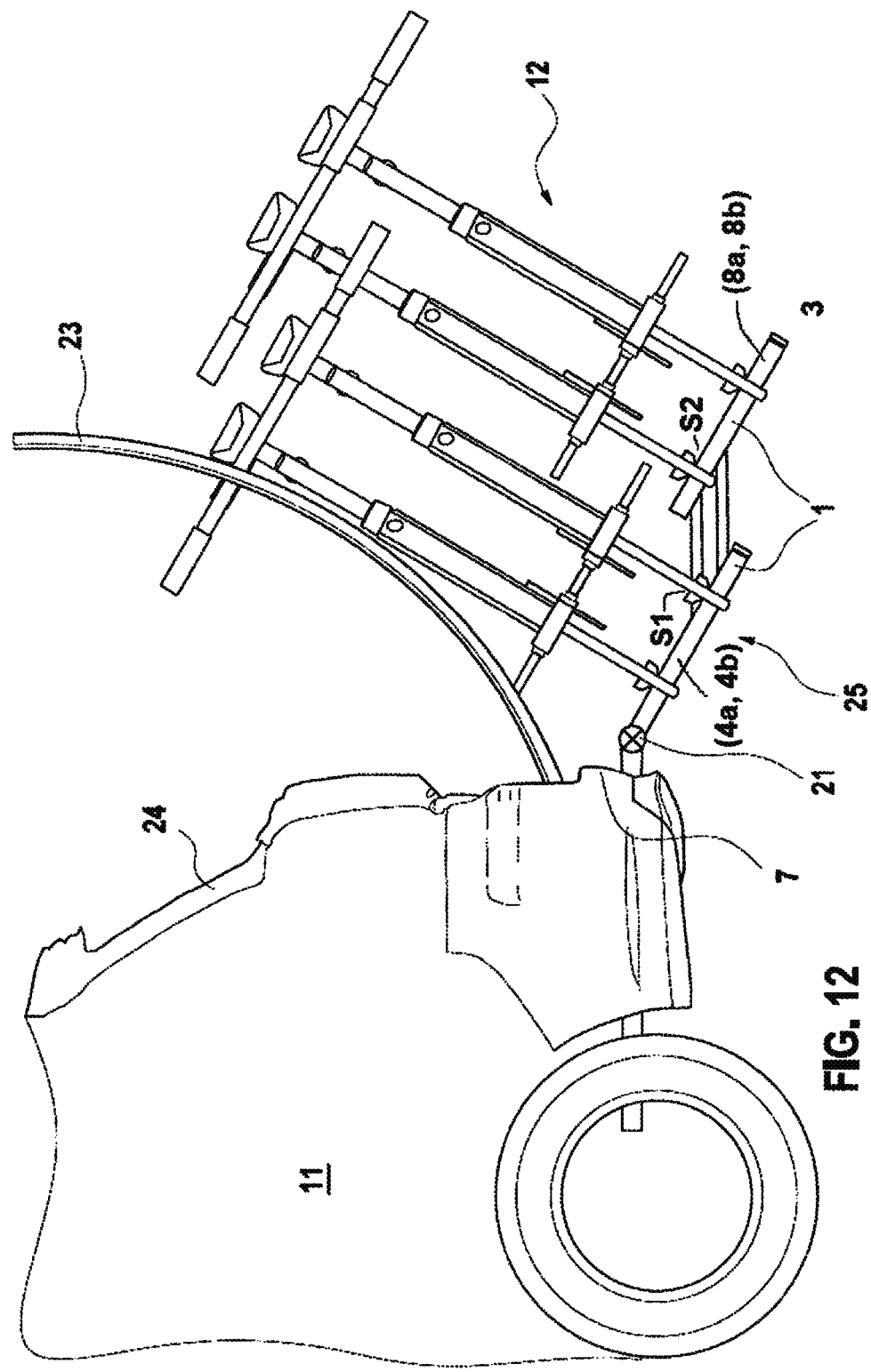
FIG. 12 is a vehicle with mounted load carrier, on which 4 bicycles tilted away from the tailgate are secured.

FIG. 12 shows a load carrier 25 with the oblong element 1 on FIG. 2 mounted to the motor vehicle 11. The four bicycles 12 are swiveled away from the tailgate 24 and are located outside of its envelope 23 (the handlebar of the outermost left bicycle is in front of the swiveling area of the tailgate 24). As a result, the luggage compartment is also accessible in the loaded state of the load carrier 25. The extension 3 consists of the two rails 8a and 8b, which each are hinged to the rails 4a or 4b (See, FIGS. 10 and 11) by way of the spacer element 9 (See FIG. 10). Among other things, the spacer element 9 can here be swiveled around axis S1 relative to the rails 4a and 4b. Among other things, it can be swiveled around axis S2 relative to rails 8a and 8b.

Even though the above specific embodiments have been described, the expert will discern that the description of these embodiments is not intended to limit the invention to the indicated form. The invention is rather intended to encompass all modifications, equivalents and alternatives that fall within the protective scope of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle comprising:
   a rearward structure having a rear swing panel positionable between a closed position and an open position; and
   a load carrier positionable relative to the rearward structure between a stowed position and a transport position, the load carrier including:
   at least one longitudinal carrier;
   at least one extendable rail connected within the at least one longitudinal carrier;
   a base segment assembled on the at least one extendable rail and configured for mounting at least one bicycle;
   a swiveling axis mounted between the at least one longitudinal carrier and the at least one extendable rail to pivot the at least one extendable rail and the base segment away from the rearward structure of the vehicle to enable positioning of the rear swing panel into the open position; and
   a sensor adapted to determine whether the base segment has been swiveled away from the rearward structure;
   wherein the load carrier is located substantially entirely below the rearward structure of the vehicle in the stowed position; and
   wherein the at least one extendable rail extends in a horizontal direction and is located behind the rearward structure of the vehicle in the transport position for transporting at least one bicycle.

2. The vehicle of claim 1, wherein the swiveling axis is oriented to pivot the base segment in a direction towards a plane below the rearward structure of the vehicle.

3. The vehicle of claim 1, wherein the swiveling axis runs in a transverse direction of the vehicle.

4. The vehicle of claim 1, wherein the at least one longitudinal carrier includes a first longitudinal carrier and a second longitudinal carrier, and wherein the first and second longitudinal carriers share the swiveling axis.

5. The vehicle of claim 1, wherein the at least one extendable rail is hinged to the at least one longitudinal carrier.

6. The vehicle of claim 1, further comprising a foldout extension.

7. The vehicle of claim 1, wherein the at least one longitudinal carrier includes three rails that telescope into each other, and wherein an innermost rail of the three rails exhibits a rotatably mounted enveloping rail.

8. The vehicle of claim 7, wherein a step-shaped plug-in section can be inserted into the innermost rail.

9. The vehicle of claim 1, wherein the load carrier is designed to securely fix a pedal rod of a bicycle.

10. The vehicle of claim 1, wherein the at least one extendable rail is guided through a bumper of the vehicle.

11. The vehicle of claim 1, wherein the at least one extendable rail is guided under a bumper of the vehicle.

12. The vehicle of claim 1, wherein the swiveling axis is mounted on the at least one extendable rail.

13. A load carrier configured for a rearward structure of a vehicle having a rear swing panel positionable between a closed position and an open position, the load carrier comprising:
   a base element fixed to the vehicle;
   a longitudinally shifting element configured to be guided into or under a bumper of the vehicle by the base element; and
   an extension configured to telescope relative to the base element, and which, when completely pulled out from the rearward structure, defines a first position of use, the extension including a first rail engaging the base element and a second rail coupled to the first rail with a hinge;

wherein the second rail is pivotable about a swiveling axis relative to the first rail defining a second use position;

wherein the load carrier is configured to swivel away from the rearward structure of the vehicle via the swiveling axis to enable movement of the rear swing panel into the open position.

14. The load carrier according to claim 13, comprising an expansion part configured to pivot with the second rail wherein the expansion part is detachably secured to the base element through the extension.

15. The load carrier according to claim 14, further comprising a sensor adapted to determine a swivel position of the load carrier for indicating when the extension is in the second use position.

16. The load carrier according to claim 13, wherein the second rail extends from the swiveling axis toward the base element enveloping the first rail when in the first position of use.

17. The load carrier according to claim 13, wherein the first rail comprises an outer rail and comprising an inner rail that telescopes into the outer rail, wherein the inner rail exhibits the second rail as an enveloping rail that envelopes the inner and outer rails when in the first position of use.

18. The load carrier according to claim 17, further comprising an expansion part detachably secured to the base element through the extension, the expansion part configured as a step-shaped plug-in section inserted into the inner rail and being pivotable with the second rail.

19. The load carrier according to claim 13 wherein the base element is trapezoidal in shape and the extension includes a trapezoidal shaped part that mates with the base element.

* * * * *